United States Patent
Anisimovich et al.

(10) Patent No.: US 7,088,873 B2
(45) Date of Patent: Aug. 8, 2006

(54) BIT-MAPPED IMAGE MULTI-STAGE ANALYSIS METHOD

(75) Inventors: Konstantin Anisimovich, Moscow (RU); Vadim Tereshchenko, Moscow (RU); Vladimir Rybkin, Moscow (RU); Dmitry Vnuchkov, Moscow (RU)

(73) Assignee: ABBYY Software Ltd., Nicosia (CY)

( * ) Notice: Subject to any disclaimer, the term of this patent is extended or adjusted under 35 U.S.C. 154(b) by 721 days.

(21) Appl. No.: 10/386,544

(22) Filed: Mar. 13, 2003

(65) Prior Publication Data

US 2004/0114802 A1 Jun. 17, 2004

(51) Int. Cl.
*G06K 9/03* (2006.01)

(52) U.S. Cl. ............................ 382/310; 382/265

(58) Field of Classification Search ................ 382/310
See application file for complete search history.

(56) References Cited

U.S. PATENT DOCUMENTS

| | | | | |
|---|---|---|---|---|
| 4,802,231 A | * | 1/1989 | Davis ............................ | 382/219 |
| 5,257,323 A | * | 10/1993 | Melen et al. ................ | 382/310 |
| 5,519,786 A | * | 5/1996 | Courtney et al. ............ | 382/159 |
| 5,590,224 A | * | 12/1996 | Fast et al. .................... | 382/291 |
| 5,594,815 A | * | 1/1997 | Fast et al. .................... | 382/254 |
| 5,717,794 A | * | 2/1998 | Koga et al. .................. | 382/309 |
| 5,881,172 A | * | 3/1999 | Pintsov ........................ | 382/227 |

* cited by examiner

Primary Examiner—Joseph Mancuso
Assistant Examiner—Damon Conover
(74) Attorney, Agent, or Firm—Sergey Platonov

(57) ABSTRACT

A method is described of bit-mapped image analysis comprising division of all analysis means at one's disposal into several groups differing in accuracy and further processing multi-stage analysis.

The analysis comprises a primary analysis stage and at least one profound analysis stage, with supplemental data collected at both stages.

The primary analysis, includes preliminary recognition of objects with distortion and detection of objects that require more precise analysis means to overcome the distortion. At the primary analysis stage, the analysis means from the group of the most inaccurate group are used.

The profound analysis stage includes repeating recognition of objects with a distortion taking into account the supplemental data obtained at the previous stage, detecting objects that require more precise analysis means to overcome the distortion, and collection of newly appeared supplemental data. Each subsequent profound analysis stage uses analysis means from the group of more accurate means.

16 Claims, 1 Drawing Sheet

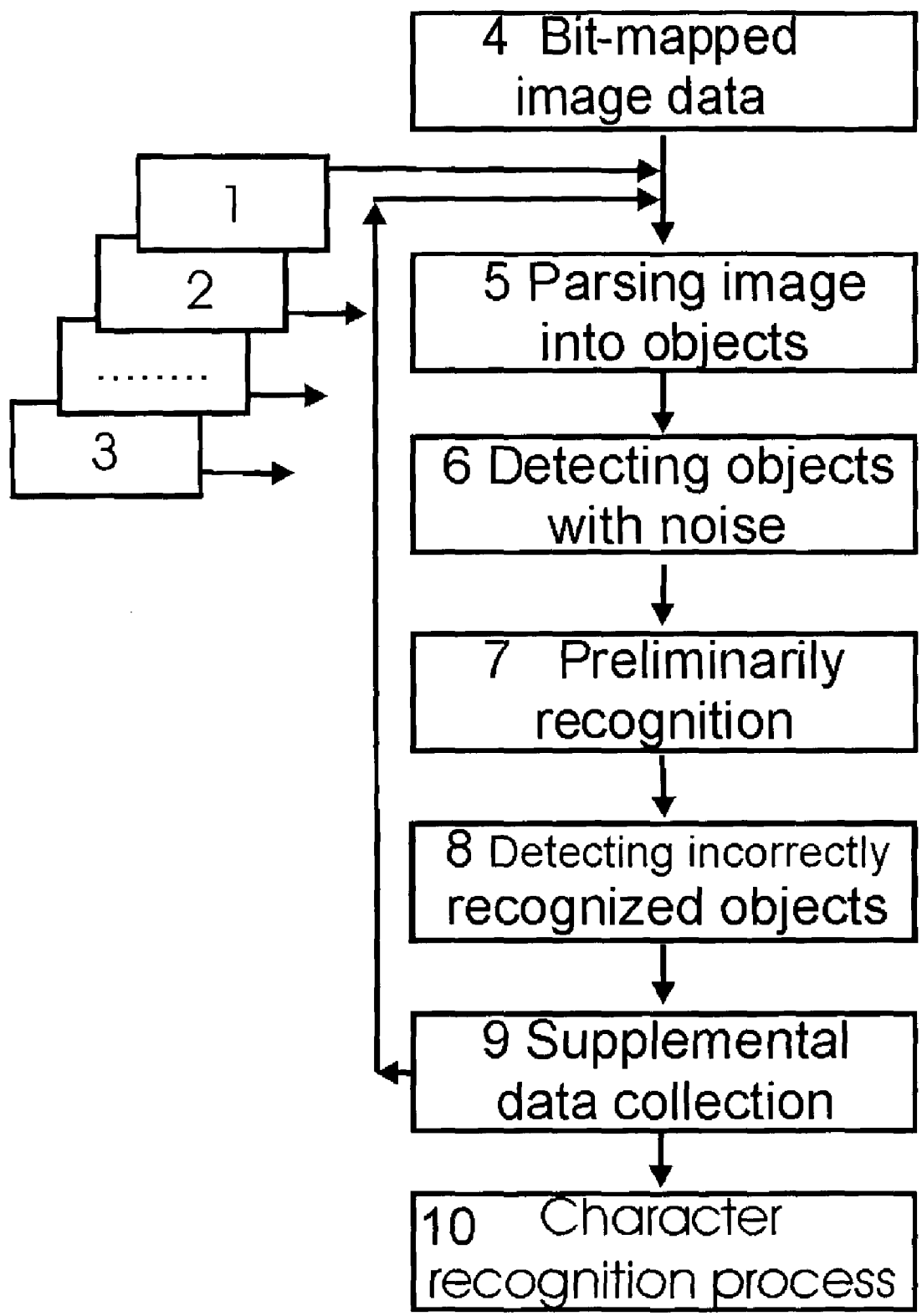

BIT-MAPPED IMAGE MULTI-STAGE ANALYSIS METHOD

BACKGROUND OF THE INVENTION

1. Field of the Invention

The present invention relates generally to a field of bit-mapped image character recognition and, more particularly, to a method of parsing and analysis pre-process assisting character and text recognition of printed text from bit-mapped binary image or other binary or raster images inputted from scanning device or like or obtained by other way.

2. Prior Art

Segmentation and parsing methods are known in the art. Typically, such methods divide an image into parcels containing homogeneous objects and use a plurality of special computing procedures, each depending on a plurality of parameters to analyze an object.

The most known methods initially divide the object into a plurality of regions, each region further dividing into smaller objects—paragraphs, lines, words, characters, non-text objects etc. After that all prior methods make various pre-recognition analysis and corrections of image to improve its quality for further text recognition. Corrections may include removing distortion of various types—distortion, skew, inversion text matter, cursive character matter, undesired dots—extra or missing etc.

A plenty of methods of preprocess analysis are known that remove the distortions in raster or bit-mapped image. (e.g. U.S. Pat. No. 5,594,815 Jan. 14, 1997). Their productivity depends mainly on an amount of distortions in the image. Each type of distortion is corrected by the only means during the analysis session.

Other kinds of prior art use new methods for parsed regions and objects analysis, differing in the amount of computing resources required. (e.g. U.S. Pat. No. 6,205,261, Mar. 20, 2001). Said methods are not enough universal, they sometimes can't vary the computing volume in accordance with extent of complexity or simplicity of the document structure.

Another known method supposes a single stage of image pre-recognition analysis mainly as an ordinary version, and an addition of one or more profound stages of analysis in a case if errors occurred at stage 1 (U.S. Pat. No. 5,717,794, Feb. 10, 1998). The incorrectness criteria in said method is the difference between the length of character string, most likely comprising a line and a resulting line, as a result of the first analysis session. But for all that no supplemental data is to be collected and used but only a repeating session with the same set of the analysis means.

One more method of the close subject deals with detecting distorted regions on the analysed image and removing the distortion in said regions by special means. (U.S. Pat. No. 5,590,224 Dec. 31, 1996). No supplemental data is collected and utilized. This considerably reduces the accuracy of the analysis. An object of present invention consists in hastening the raster (bit-mapped) image analysis procedure without any loss in quality and accuracy.

SUMMARY OF THE INVENTION

In view of problem mentioned above, the present invention has for its object to suggest in detail the method, which can efficiently correct the errors detecting at the step of layout analysis.

According to the present invention, a method of bit-mapped image analysis that precedes character recognition procedures, comprises
  preliminarily dividing the whole set of analysis means at the disposal into a number of groups differing in accuracy;
  at least two stage analysis, comprising
    i) a primary analysis stage, said primary analysis further comprising at least
      parsing the image into regions and objects,
      detecting among said regions and objects those with a distortion embarrassing character recognition,
      preliminary recognition of said objects with the distortion,
      detecting objects that require more sophisticated analysis methods,
      collection of supplemental data;
    said primary analysis stage using the analysis means from group of most inaccurate means;
    ii) at least one profound analysis stage, comprising
      repeated recognition of said objects with the distortion that were not recognized at the previous stage taking into account the supplemental data obtained at the previous stage,
      detecting said objects and regions, that require more sophisticated analysis methods,
      collection of newly appeared supplemental data,
      making a decision about the necessity of the profound analysis stage repeating, taking into account all said supplemental data collected at previous and current stages, or finishing the analysis process;
    said each subsequent profound analysis stage using analysis means from the group of more accurate means.

Thus after the said two stage procedure the efficient image analysis and correction can be performed.

The present invention also presumes further outputting the results to a subsequent process, which is typically a character recognition process.

BRIEF DESCRIPTION OF THE DRAWING

FIGURE is a block diagram showing the list of steps to be made on analysis of bit-mapped image according to the present invention.

DETAILED DESCRIPTION OF THE INVENTION

A method of the present invention consists in a preliminary dividing of all plurality of analysis means that are present at one's disposal into two or more groups, differing in accuracy and reliability of results, with the further performing the multi-stage analysis.

The starting-point of the present invention is the presumption coming from engineering practice, that the more precise is the analysis means or a computing method or a procedure, the more computing resources it require for operation. And in contrary, the simpler is the analysis means or computing procedure, the less accurate are the results obtained.

The two or more stage analysis is performed then.

The first stage comprises parsing the image into objects, detecting and preliminarily analyzing objects that comprises a distortion, preliminarily recognizing objects that comprises a distortion, detecting among them objects, that require more precise analysis means to overcome the distortion influence, collecting a supplemental data about objects.

As assumed hereinafter, objects are regions, groups of lines, paragraphs, lines, word tokens, words and groups of characters, except as otherwise provided.

The distortion as assumed in the present invention is any factor hindering a character and the whole text recognition process, except as otherwise provided.

The distortion may appear as undesired dots in the image (extra or missing), cursive character or text matter, inverted text matter, a skew of the image, etc.

According to the present invention, on the first stage of analysis, the analysis means are taken from the group of the most incorrect means. Those analysis means according to the presumption require less computing resources, not so complicated and, therefore, quicker. Also a collection of all available supplemental data is provided on this stage.

The second stage, that is the profound analysis, comprises repeated parsing of image or a part of it, if required, detecting and analyzing objects with the distortion, repeated recognition of objects with the distortion, that were not recognized at the previous stage, taking into account all supplemental data obtained at the previous stage, detecting among them objects, that require more sophisticated analysis means to overcome the influence of distortion, collecting an newly appeared additional data about objects. At this stage the more precise analysis means are used. They are taken from the subsequent group—more precise one.

The last step of the profound analysis stage is making a decision about the necessity of repeating the profound analysis stage, taking into account all supplemental data collected at the previous stages, or finishing the analysis process. The decision is made mainly depending on recognition reliability level settled and a number of groups of analysis means rest.

If decided to repeat the stage of profound analysis, it is to be made as described in connection with the profound analysis stage taking into account all previously collected supplemental data. What is important here is that on each subsequent stage of profound analysis the analysis means from group of more precise means should be used.

The iteration process will be finished in one of the following cases:
  the character recognition reliability factors of all objects meet or exceed the predetermined level, or
  if more precise methods of analysis are no longer available.

At the completion of analysis all the data is being sent to a subsequent process, typically a character recognition process.

The FIGURE shows the order in which analyzing steps are to be performed according to the present invention.

Blocks 1 through 3 (including unnumbered block with "......") shows the set of analysis means preliminarily divided into several groups, differing in accuracy. The set of the most inaccurate analysis means is marked as block 1, the set of most accurate—as block 3.

Initially an inputted bit-mapped image data (4) along with the set (1) of the most inaccurate but quick means is sent to primarily analysis. All data is being parsed into objects (5). Objects that contain any kind of distortion (6) are detected and placed to special list. Objects containing distortion are further subjected to a preliminary character recognition (7). After the preliminary character recognition, some objects (8) will be marked as requiring a more precise method of analysis in order to overcome the distortion.

Along with the analyzing process, the supplemental data is collected (9).

After that said bit-mapped image data along with the collected supplemental data (9) and the set (2) of the more accurate means, then in the set (1), is sent to profound analysis. All data is being examined for requiring new parsing. It is parsed again whole or partly if required (5). Objects that contain distortion (6), not overpassed at the previous stage, are marked and recorded. Marked objects are then subjected the character recognition process (7) taking into account all supplemental data (9) obtained at the previous stage. After character recognition some of the objects (8) are marked as requiring a more precise method of analysis in order to overcome the distortion.

A newly appeared supplemental data is being collected (9) during all the analyzing process.

According to character recognition results and taking into account all supplemental data collected, a decision is made on repeating or not the profound analysis stage.

The profound analysis is not repeated in one of the following cases
  characters in all objects containing distortion are correctly recognized with the reliability factor that meets or exceeds the predetermined reliability value;
  the set of most precise analyzing means is applied, but failed to recognize all the objects containing distortion. More precise means of analysis are no longer available.

At the decision of finishing the analysis process, all the results along with the whole supplemental data collected at all previous stages are outputted to a subsequent process, which is typically a character recognition process.

We claim:

1. A method of bit-mapped image analysis comprising
preliminary division of all analysis means at the disposal into two or more groups differing in accuracy of results;
performing a multi-stage analysis, said analysis further comprising at least
  a primary analysis stage along with collection of supplemental data, said primary analysis further comprising at least parsing the image into objects, detecting among said objects those with distortion that embarrasses character recognition, preliminary recognition of said objects with the distortion, detecting among said objects those requiring more accurate analysis means to overcome the influence of distortion, said primary analysis stage using the analysis means from group of most inaccurate means;
  at least one profound analysis stage along with collection of newly appeared supplemental data, said profound analysis stage further comprising repeating of recognition of said objects with distortion that were not recognized at the previous stage taking into account the supplemental data obtained at the previous stage, detecting among said objects those requiring more accurate analysis means to overcome the influence of distortion, collection of newly appeared supplemental data, making a decision about the necessity of repeating of the profound analysis stage taking into account the whole supplemental data collected at the previous stages or finishing the analysis process, each subsequent profound analysis stage using the analysis means from the group of more accurate means.

2. The method of bit-mapped image analysis as recited in claim 1, further comprising outputting results to a subsequent process.

3. The method of bit-mapped image analysis as recited in claim 2, wherein the subsequent process is a character recognition process.

4. The method of bit-mapped image analysis as recited in claim 1, further comprising additional correction of objects parsing at the profound analysis stage.

5. A method of bit-mapped image analysis as recited in claim 1, wherein the decision about whether or not to perform repeating of the profound analysis stage is made taking into account a predetermined recognition accuracy level.

6. A method of bit-mapped image analysis as recited in claim 1, wherein the decision not to process the repeating of the profound analysis stage is made after exhausting all analysis means at the disposal.

7. A method of bit-mapped image analysis as recited in claim 1, wherein the distortion may appear as cursive character matter.

8. A method of bit-mapped image analysis as recited in claim 1, wherein the distortion may appear as inverted character matter.

9. A method of bit-mapped image analysis as recited in claim 1, wherein the said distortion may appear as extra dots in the image.

10. A method of bit-mapped image analysis as recited in claim 1, wherein the said distortion may appear as missing dots in the image.

11. A method of bit-mapped image analysis as recited in claim 1, wherein the distortion may appear as a skew of the image.

12. A method of bit-mapped image analysis as recited in claim 1, further comprising an additional step of removing distortion from the image.

13. A method of bit-mapped image analysis as recited in claim 1, wherein supplemental data may be represented as a correlation among the parameters of the characters within the object.

14. A method of bit-mapped image analysis as recited in claim 1, wherein supplemental data may be represented as correlation of parameters within the line.

15. A method of bit-mapped image analysis as recited in claim 1, wherein supplemental data may be represented as correlation of parameters between plurality of objects.

16. A method of bit-mapped image analysis as recited in claim 1, wherein at least one supplemental image analysis means of other kind may be used before the character recognition process.

* * * * *